United States Patent
Miller et al.

[11] Patent Number: 5,967,653
[45] Date of Patent: Oct. 19, 1999

[54] LIGHT PROJECTOR WITH PARABOLIC TRANSITION FORMAT COUPLER

[76] Inventors: Jack V. Miller; Ruth Ellen Miller, both of R.R. 4, Box 748, Seaford, Del. 19973

[21] Appl. No.: 08/906,988
[22] Filed: Aug. 6, 1997
[51] Int. Cl.[6] ........................................ F21V 8/00
[52] U.S. Cl. ............................ 362/580; 385/43; 385/901; 362/558
[58] Field of Search ................................. 362/558, 580; 385/43, 901

[56] References Cited

U.S. PATENT DOCUMENTS

| | | | |
|---|---|---|---|
| 4,076,378 | 2/1978 | Cole | 385/43 X |
| 5,099,399 | 3/1992 | Miller et al. | 362/580 |
| 5,233,679 | 8/1993 | Oyama | 362/558 X |
| 5,764,845 | 6/1998 | Nagatani et al. | 385/901 |
| 5,845,024 | 12/1998 | Tsushima et al. | 385/43 X |

Primary Examiner—Laura K. Tso

[57] ABSTRACT

This invention applies to the field of light projectors for graphics media, such as movie film, projection slides, liquid crystal cells and fiber optic arrays. High light levels have not been possible with prior art projectors due to plastic media aging and melting in the heat of concentrated light; due to optical inefficiencies in converting circular lamp beams to a rectangular medium format; and due to mismatches between the numerical aperture of the lamp to the graphics media. The present invention solves the heating problem by providing a projector having an elongated, heat absorbing glass coupler between the light source and the graphics medium; it solves the optical inefficiency problem by providing the coupler with a circular light entrance end and a rectangular exit end; and it solves the numerical aperture problem by providing the coupler with a generally parabolic shape that collimates extreme off-axis light rays.

5 Claims, 2 Drawing Sheets

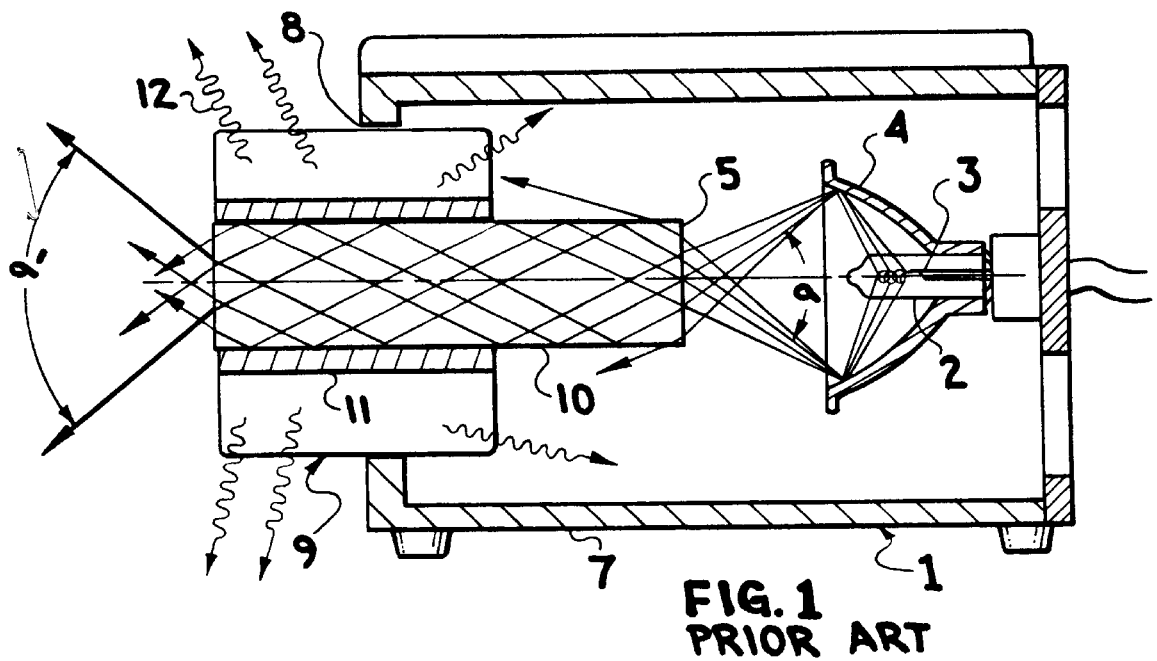
FIG. 1
PRIOR ART
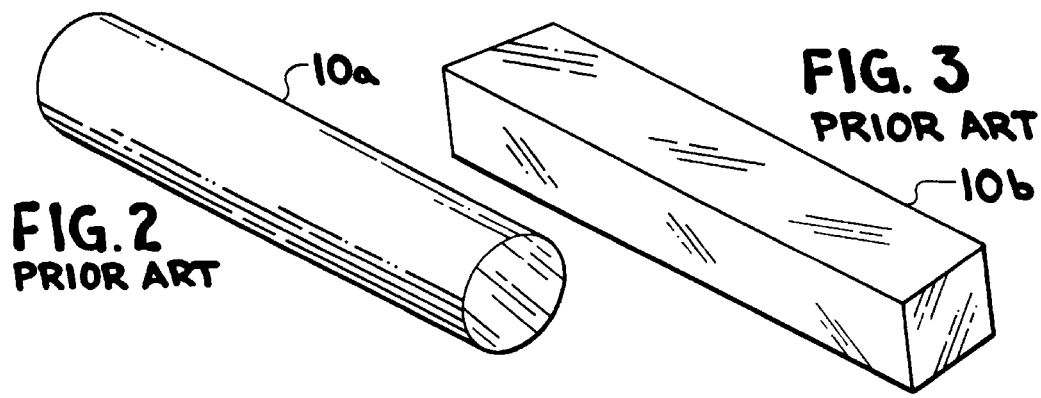
FIG. 2
PRIOR ART
FIG. 3
PRIOR ART
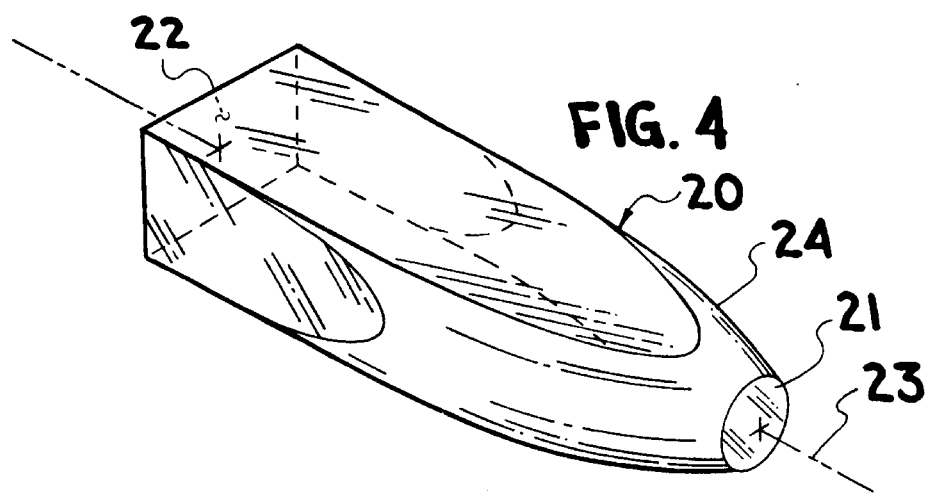
FIG. 4

LIGHT PROJECTOR WITH PARABOLIC TRANSITION FORMAT COUPLER

BACKGROUND OF THE INVENTION

A principal disadvantage of prior art projection systems is that they heat, age and melt film, slides, liquid crystal cells and even optical fiber ends. Many thermal control methods are presently used to reduce the heat to protect such media. A most effective method for controlling media temperature is shown in the present inventor's U.S. Pat. No. 5,099,399, which uses a cylindrical glass coupler between the lamp and the graphics medium. A reflector lamp focuses a very intense spot of light on a proximal (inner) end of the glass coupler. The glass rod absorbs the infrared heat and conducts it out of the light beam. The coupler described in the '399 patent has a tuned length to diameter aspect ratio, whereby very intense and sharply-focussed, light enters the proximal end of the coupler, but the light emitted from the other end is cold and uniformly distributed across the distal (outer) end glass surface. As a result, after continuous operation of a 150-watt lamp, one can touch the end of the glass rod and feel no heat. This has proven highly successful in use since 1991, and it is so efficient that 150-watt projector according to the '399 patent produces more usable light than most 250-watt projectors.

Another disadvantage of prior art projectors, including movie projectors, video projectors and fiber optics projectors is that they produce light in a circular beam, but the graphics media used, such as movie film, projection slides, liquid crystal cells or imaging fiber optic arrays, are all rectangular. The transition from the circular lamp beam to a rectangular medium format is currently accomplished by using a rectangular mask to shape the light beam before it strikes the mask. The mask can be a simple planar aperture, or it can be a rectangular glass coupler, such as in U.S. Pat. No. 5,341,445, which uses a polygonal coupler instead of the cylindrical coupler of the '399 Patent. Polygonal masks are optically inefficient, as the edges of the circular lamp beam are clipped off, allowing only the rectangular portion of the circular beam to pass into the mask and onto the graphics medium.

Although the inventor's '399 patent solved the media heating problem, there is still another limitation on projected beam brightness and overall optical efficiency. That limitation is the numerical aperture mismatch between the projection lamp and the imaging medium.

A projection lamp has a very large aperture, near F:1, to capture and focus as much of the source radiation as possible. An aperture of f:1 means the distance from the lamp reflector face to the focal plane, where the source in imaged as a bright spot, is equal to the reflector diameter. Therefore, in an f:1 aperture, the total included angle of the beam is approximately 90°. Due to the greater distance from the source to the rim of the reflector where the image magnification is the least, the reflector lamp produces the smallest, most intense light spot almost entirely from the widest angle rim rays.

However, most graphics projectors have an aperture of at least f:4, where the maximum light acceptance angle of an image-projecting lens is only about 50°. Thus, most of the lamp light, which is contained in the sharply-focussed light incident on the medium at between 50° and 90° off axis cannot be seen by the projection lens and is just thrown away.

In the case of optical fiber arrays the numerical light acceptance aperture is about f:2, as any incident light beyond the angle of total internal reflection of the fibers simply passes out the sides of the fibers and is lost as "side glow". Thus, the lamp light contained in the sharply-focussed light incident on the medium at between 70° and 90° off axis is also thrown away.

A first purpose of the present invention is to provide a projector having high-efficiency light coupler that absorbs and dissipates the beam heat before it reaches the projection medium. A second purpose of the present invention is to provide a projector in which sharply-focussed energy of an f:1 aperture projection lamp is accepted by the entrance end of an f:1 aperture coupler, and be emitted from the exit end of the coupler at an exit aperture of f:2 to f:4, or the optimum f-stop aperture for the specific graphic medium used in the projector.

A third purpose of the present invention is to provide a projector having a light coupler in which the sharply-focussed circular light pattern from a projection lamp is efficiently transformed by the coupler into a rectangular exit beam.

A fourth purpose of the present invention is to provide a projector having a light coupler in which wide angle rays from a projection lamp are substantially collimated into narrow angle rays that can be effectively utilized by the graphics medium.

SUMMARY OF THE INVENTION

The achievement of the foregoing purposes of the invention is accomplished by the preferred embodiment of the present invention in which a projector includes a source of light, including heat, on an optical axis and an optical element coaxially disposed on the optical axis, forming an image of the light source at an image plane. A housing encloses the source of illumination, the optical element and the image plane. An exit aperture through the housing holds a thermal control bushing including a light transmitting and heat conducting glass coupler on the optical axis having a round proximal first end at the focussed image plane of the light source and a rectangular distal second end near or in contact with a graphics medium which may be movie film, slide film transparency, liquid crystal display or optical fibers of a light guide array.

The optical coupler is in thermal contact with the thermal control bushing, whereby heat from light source is absorbed by the optical coupler, conducted to the thermal control bushing and dissipated from the exterior of the thermal control bushing. In a preferred embodiment the optical coupler is made of infrared absorbing glass and has a round proximal first end into which the light source energy is a sharply focussed into a convergent conical beam having a wide included angle, and a rectangular distal second end at which the light source visible light is defocussed. The entrance light rays are transmitted through the length of the coupler by internal reflections, and are partially collimated by a generally parabolic transition section into a divergent conical exit beam having an included angle substantially smaller than the convergent conical angle of the entrance beam.

BRIEF DESCRIPTION OF THE DRAWINGS

FIG. 1 is a side-elevation schematic cross-sectional view of a prior-art graphics projector.

FIG. 2 is a perspective view of a cylindrical glass coupler used in prior-art projectors.

FIG. 3 is a perspective view of a rectangular glass coupler used in prior-art projectors.

FIG. 4 is a perspective view of a round-to-rectangular transition glass coupler according the the present invention.

DETAILED DESCRIPTION OF THE DRAWINGS

Figure 5:
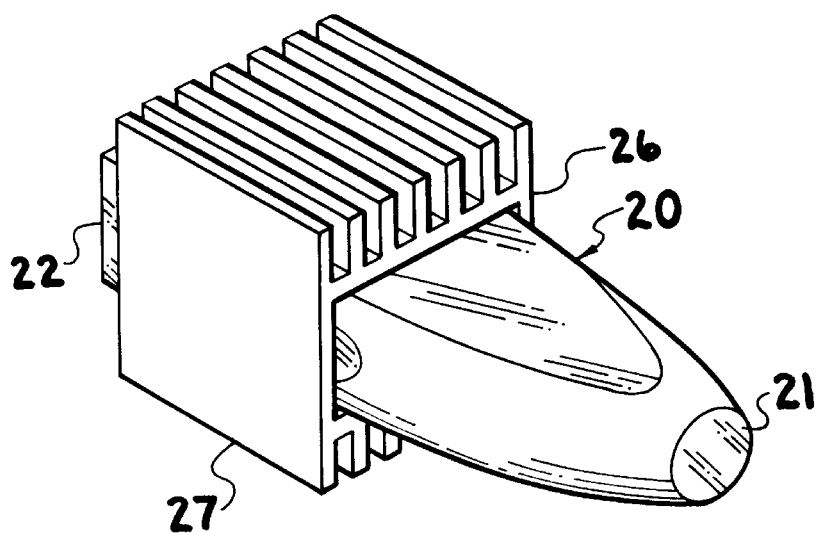
FIG. 5 is a perspective view of a round-to-rectangular transition glass coupler in a thermal control bushing according the the present invention.

In FIG. 1 the schematic cross-section of a prior art light projector is shown as a projector 1 having a source of illumination 2, including heat, on an optical axis 3, energized from a remote source of electrical power. An optical element 4, shown as an ellipsoidal reflector, is coaxially disposed on the optical axis and focussing the illumination in a convergent conical beam at an image plane 5 at the proximal first end of a cylindrical glass coupler rod 10. A housing 7 encloses the source of illumination, the optical element and the image plane, said housing having an exit aperture 8. A thermal control bushing 9 is disposed on the optical axis in the exit aperture of the housing. The bushing includes glass coupler 10, which is coaxially disposed on the optical axis and thermally bonded into a passage through heat radiator 11. Glass coupler 10 has a sufficient length that the illumination at the distal second end of the coupler 10 is substantially out of focus, so the sharply-focussed beam at the proximal end is uniformly distributed across the distal end of the coupler. This general arrangement is shown and described in the inventor's U.S. Pat. No 5,099,399.

FIG. 2 is a perspective view of a typical elongated round glass coupler 10a in current production projectors.

FIG. 3 is a perspective view of a prior-art rectangular rod 10b of the same approximate aspect ratio as the coupler of FIG. 3, which is the functional equivalent of the round rod with respect to thermal control, and has the same beam dispersion in terms of numerical aperture as the glass rod. It is obvious that either the round coupler 10a of FIG. 2 or the rectangular coupler 10b of FIG. 3 could be represented as the prior art coupler 10 in FIG. 1.

The illustration shown in FIG. 1 represents the present state of prior art optical geometry to maintain projection media at or below the 70° C. avoid damage to plastic graphics materials. The strongest and most sharply-focussed focussed rays from the reflector are shown in a convergent cone having an included angle a, centered on the proximal first end of glass coupler 10. The glasses used for this purpose may be varied to produce the desired transmission spectrum, and can range from high-lead glass through borosilicate glass to high-purity silica glass known as quartz. The glass rod acts optically like a single fiber optic light guide, wherein the rays pass through the rod in multiple reflections, exiting distributed across the distal end within angle a', which is identical to angle a of the proximal end of the coupler. Thus, the numerical aperture of the lamp and reflector combination, which is typically f:1 is the numerical aperture of the exit cone where the exiting beam diameter and the distance from the rod distal end remain approximately equal for an f:1 aperture.

In FIG. 4 a parabolic glass coupler 20 according to the present invention is shown having a proximal entrance end 21 and a distal exit end 22, shown as a rectangle to match the format of most projection graphics media and extending in rectangular shape for a portion of the coupler length. The transition between the round proximal end and the rectangular distal end is generally in the shape of a parabola 24 of revolution about optical axis 23.

In FIG. 5 the rectangular portion, and part of the parabolic portion of glass coupler 20 is shown thermally bonded into a rectangular aperture 26 in thermal control bushing 27 leaving the rectangular distal exit end 22 exposed to provide illumination in the rectangular format of projection graphics media.

Figure 6:
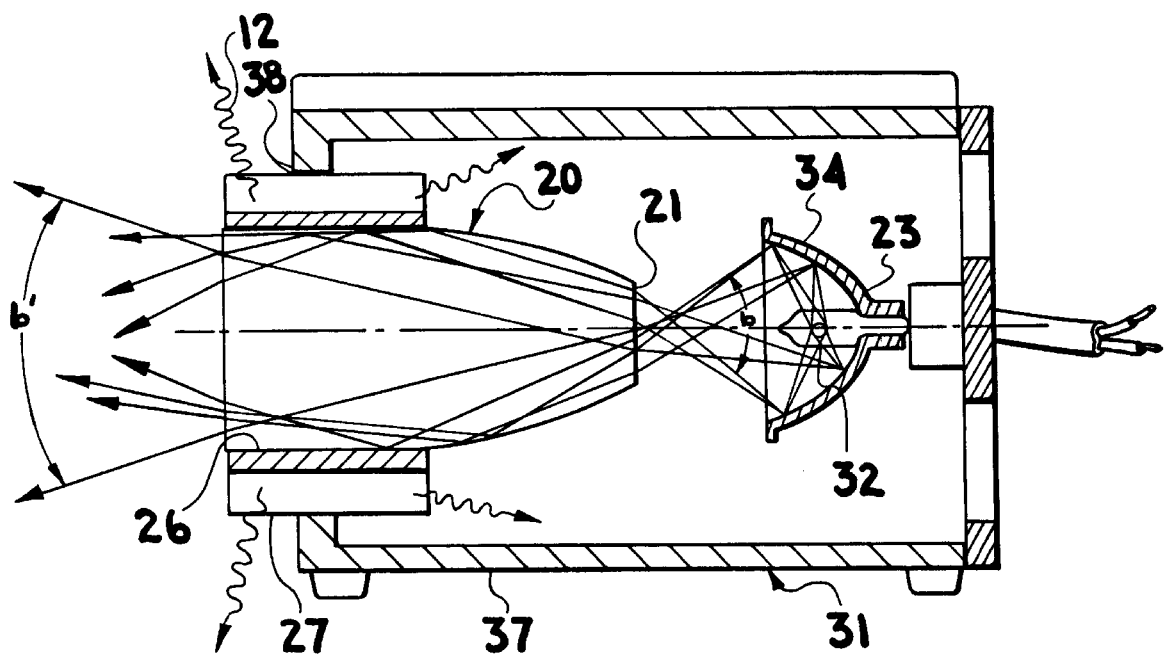
FIG. 6 is a side-elevation schematic cross-sectional view of a preferred embodiment of a projector in accordance with the present invention.

In FIG. 6 the schematic cross-section of a light projector according to the present invention is shown as a projector 31 having a source of illumination 32, including heat, on an optical axis 23, energized from a remote source of electrical power. An optical element 34, shown as an ellipsoidal reflector, is coaxially disposed on the optical axis 23 and focuses the illumination in a convergent conical beam at an image plane on the proximal first end 21 of the parabolic glass coupler 20. A housing 37 encloses the source of illumination, the optical element and the image plane, said housing having an exit aperture 38. The thermal control bushing 27 is disposed on the optical axis in the exit aperture 38 of the housing. The bushing includes parabolic glass coupler 20, which is coaxially disposed on the optical axis and thermally bonded into a passage 26 through heat radiator 27. Parabolic glass coupler 20 has a sufficient length that the illumination at the distal second end of the coupler 20 is substantially out of focus, so the sharply-focussed beam at the proximal end is uniformly distributed across the distal end of the coupler.

The parabolic glass coupler has sufficient length to absorb the lamp heat to maintain projection media at or below the 70° C. avoid damage to plastic graphics materials. The strongest and most sharply-focussed rays from the reflector are shown in a convergent cone having an included angle b. centered on the proximal first end of glass coupler 20. The glass coupler acts optically like a deep parabolic reflector, wherein the axial rays pass through the coupler without reflections. Wider off-axis rays pass through the coupler with one internal reflection that substantially collimates such rays, and extreme off-axis rays pass through the coupler with multiple internal reflections that also substantially collimate the rays. Rays from the light source then exit the coupler distributed across the distal end within angle b', which is a narrower exit angle than entrance angle b at the proximal end of the coupler. Thus, although the numerical aperture of the lamp and reflector combination, remain typically f:1, the numerical aperture of the exit cone of the glass coupler distal end may be changed to an aperture of f:2 to f:4 to match the acceptance aperture of typical graphics media.

The described and illustrated embodiments of the present invention have been shown to accomplish basic purposes of the present invention; to provide a projector having high-efficiency light coupler that absorbs and dissipates the beam heat before it reaches the projection medium; to provide a projector in which sharply-focussed energy of an f:1 aperture projection lamp is accepted by the entrance end of an f:1 aperture coupler, and is emitted from the exit end of the coupler at an exit aperture of f:2 to f:4, or the optimum f-stop aperture for the specific graphics medium used in the projector; to provide a projector having a light coupler in which the sharply-focussed circular light pattern from a projection lamp is efficiently transformed by the coupler into a rectangular exit beam; and to provide a projector having a light coupler in which wide angle rays from a projection lamp are substantially collimated into narrow angle rays.

It will be obvious to anyone skilled in the art that the principles described herein can be applied to any desired degree of exit-angle collimation, and for any height-to-width aspect ratio desired for a specific application. The principles can also be applied to lamp and reflector combinations which may have even steeper numerical apertures with greater optical collection efficiencies. It will also be obvious to anyone skilled in the art that the rectangular distal end of the coupler could be of any geometric cross-sectional shape required for a specific graphics medium, using the parabolic transition from a round entrance aperture to accept high-angle entrance aperture rays and substantially collimating such rays into a desired geometric shape having an exit beam angle substantially narrower than the entrance beam angle.

We claim:

1. A light projector including:

a source of illumination including heat on an optical axis, energized from a remote source of electrical power;

an optical element coaxially disposed on the optical axis and focussing the illumination source at an image plane;

a housing enclosing the source of illumination, the optical element and the image plane, said housing having an exit aperture;

and an elongated, substantially parabolic glass coupler on the optical axis of the exit aperture of the housing, said coupler having a proximal first circular end receiving focussed light at the image plane of the optical element and a distal second rectangular end at which the light is substantially out of focus and partially collimated.

2. A light projector according to claim 1 in which the glass coupler has a length such that heat from the illumination is substantially absorbed from the light beam.

3. A light projector according to claim 1 in which the glass coupler is in thermal contact with a thermal control bushing including a means for dissipating said heat.

4. A light projector according to claim 3 in which the thermal control bushing has heat radiating surface areas comprising a plurality of heat radiating fins.

5. A light projector according to claim 1 in which the glass coupler is provided with an infrared reflecting, visible light transmitting surface at its circular proximal end.

\* \* \* \* \*